United States Patent [19]
Mayer et al.

[11] Patent Number: 5,277,496
[45] Date of Patent: Jan. 11, 1994

[54] HIGH TEMPERATURE OPTICAL PROBE

[75] Inventors: Christopher R. Mayer, Windham, N.H.; Leon Reznikov, Swampscott, Mass.

[73] Assignee: Ametek, Inc., New York, N.Y.

[21] Appl. No.: 916,791

[22] Filed: Jul. 17, 1992

Related U.S. Application Data

[63] Continuation of Ser. No. 599,403, Oct. 17, 1990, abandoned.

[51] Int. Cl.$^5$ .............. G01K 1/14; G01K 1/10; G01K 1/12; G01K 13/02; G01J 5/04
[52] U.S. Cl. ............... 374/130; 374/131; 374/208; 374/144; 356/43; 250/338.1; 250/340
[58] Field of Search ............ 374/208, 130, 131, 139, 374/140, 144, 148; 356/43; 250/340, 338.1

[56] References Cited

U.S. PATENT DOCUMENTS

| 2,490,617 | 12/1949 | Bristol | 374/140 |
|---|---|---|---|
| 2,709,367 | 5/1955 | Bohnet | 374/131 |
| 3,626,758 | 12/1971 | Stewart et al. | 374/131 |
| 3,716,450 | 2/1973 | Lions | 374/208 |
| 3,913,058 | 10/1975 | Nishio et al. | 374/144 |
| 4,152,938 | 5/1979 | Danninger | 374/148 |
| 4,178,798 | 12/1979 | Wessel | 374/144 |
| 4,362,057 | 12/1982 | Gottlieb et al. | 374/152 |
| 4,459,043 | 7/1984 | Luke | 374/130 |
| 4,576,486 | 3/1986 | Dils | 374/131 |
| 4,630,939 | 12/1986 | Mayes | 374/138 |
| 4,657,385 | 4/1987 | Pointer | 374/130 |
| 4,679,934 | 7/1987 | Ganguly et al. | 356/43 |
| 4,737,038 | 4/1988 | Dostoomian | 374/131 |
| 4,750,139 | 6/1988 | Dils | 374/133 |
| 4,770,544 | 9/1988 | Mossey | 374/130 |
| 4,780,832 | 10/1988 | Shah | 374/130 |
| 4,794,619 | 12/1988 | Tregay | 374/131 |
| 4,796,671 | 1/1989 | Furushima et al. | 374/208 |
| 4,859,079 | 8/1989 | Wickersheim et al. | 374/131 |
| 4,906,106 | 3/1990 | Kaufmann et al. | 374/131 |

FOREIGN PATENT DOCUMENTS

| 0038980 | 3/1977 | Japan | 374/144 |
|---|---|---|---|
| 0058109 | 5/1979 | Japan | 374/144 |
| 0111428 | 5/1986 | Japan | 374/208 |
| 0217129 | 9/1987 | Japan | 374/139 |
| 1-321327 | 12/1989 | Japan | 374/208 |
| 1334550 | 10/1973 | United Kingdom | 374/208 |
| 2045433 | 10/1980 | United Kingdom | 374/208 |
| 2045921 | 11/1980 | United Kingdom | 374/131 |

OTHER PUBLICATIONS

1700° C. Optical Temperature Sensor, Report No. CR-175108, GE Final Report, Jul. 1986 (appendices omitted).

*Primary Examiner*—William A. Cuchlinski, Jr.
*Assistant Examiner*—Diego F. F. Gutierrez
*Attorney, Agent, or Firm*—Amster, Rothstein & Ebenstein

[57] ABSTRACT

A high temperature optical probe for an optical gas temperature sensor includes a support, a generally conical hollow tip, and a joint physically interconnecting the support and the tip. The tip includes as an electromagnetic radiation emitter a sapphire-free ceramic selected from the group consisting of silicon carbide and silicon nitride.

23 Claims, 3 Drawing Sheets

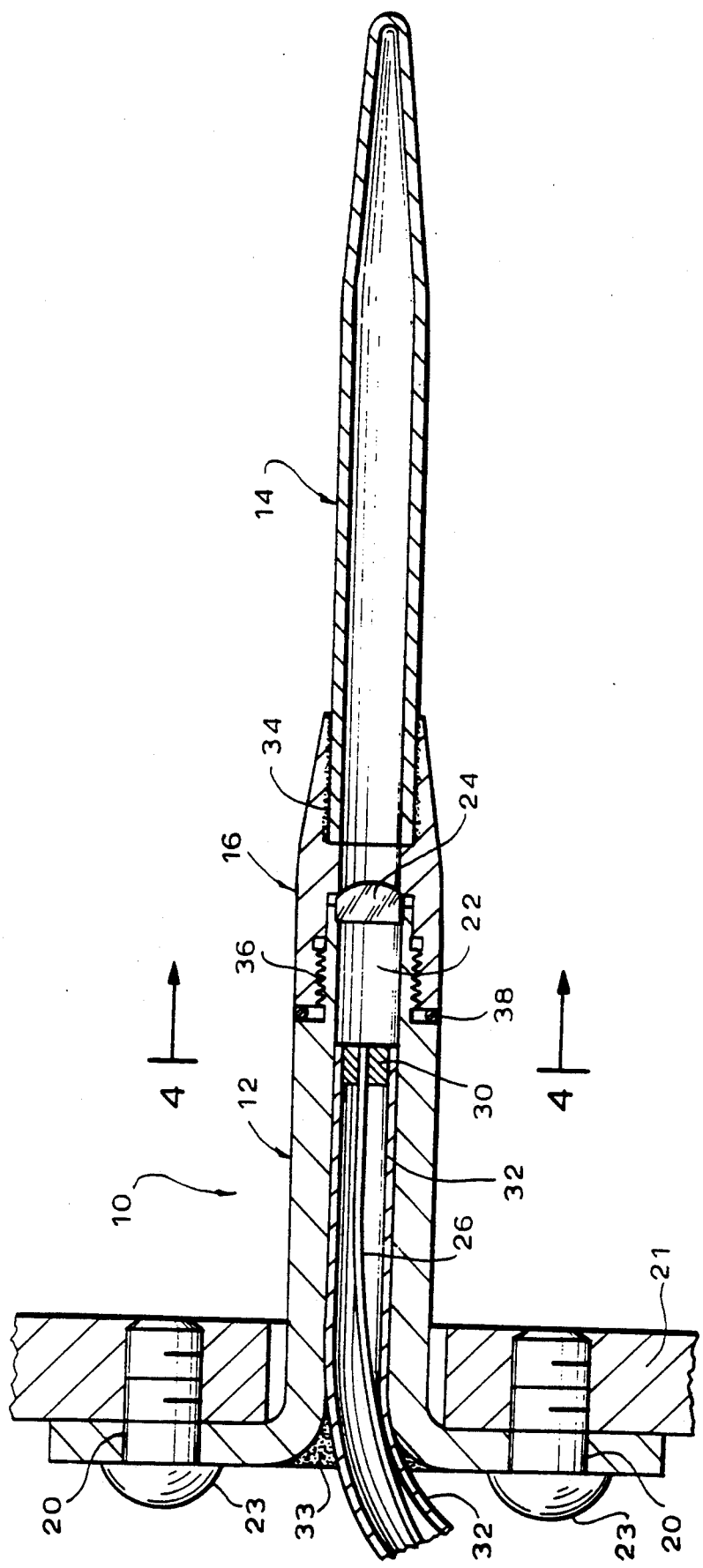

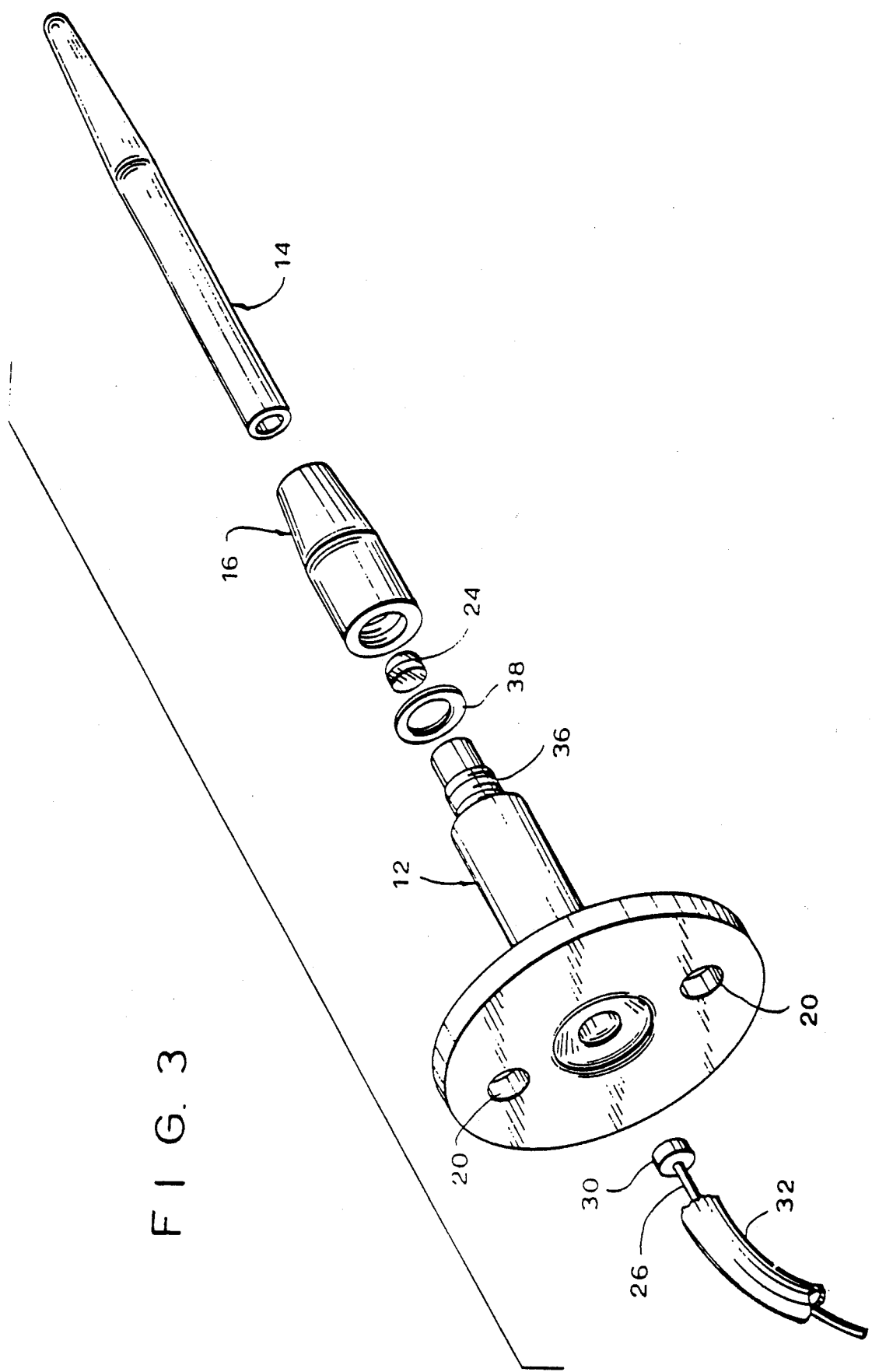

HIGH TEMPERATURE OPTICAL PROBE

This is a continuation of copending application Ser. No. 07/599,402 filed on Oct. 17, 1990 now abandoned.

BACKGROUND OF THE INVENTION

The present invention relates to an optical gas temperature sensor, and more particularly to a high temperature probe therefor.

Optical gas temperature sensors are well known in the art. Such a sensor is conventionally used by immersing the probe (and more particularly the conical tip of the probe) in the hot gas stream to be measured, and allowing the probe to remain until it is heated to approximately the temperature of the hot gas stream. At that temperature, infrared light (typically 1.0 to 1.7 microns in wave length) is emitted from the inner surface of the probe tip (which may contain a separate emitter), selected by a lens, and focused by the lens onto a fiber optic or light guide for transmission to a photodiode. The photodiode converts the focussed light into an electrical current, amplifiers in an opto-electronic unit condition the analog signal, and a program in a computer or microprocessor converts the analog signal into usable engineering units of temperature.

U.S. Pat. No. 4,770,544 describes an optical gas temperature sensor having a high temperature probe formed of a single crystal sapphire rod divided into a wave guide region and a cavity region. The cavity region is generally conical and is coated with an infrared radiation emitter having a high melting temperature, such as sputtered iridium. The iridium coating is in turn being covered by a protective coating, such as sputtered alumina. The nature of the materials used to form the high temperature probe of an optical gas temperature sensor may vary considerably. Some materials require the use of a separate emitter in order to provide infrared radiation in response to the sensed temperatures, while others do not. Many of the probes utilize materials such as refractory materials (including oxides of aluminum, silicon, zirconium and yttrium), black bodies formed of finely dispersed carbon and a silicon adhesive, quartz or glass, noble metals, steel, luminescent materials, and the like.

While a variety of different materials have been used for the probes, as noted above, the most common probes are sapphire probes provided in various shapes and with various coatings. However the sapphire probes have not proven to be entirely satisfactory. The probe tips are subjected to extreme thermal shock (on the order of 1,000° F. per second), high temperature stress, oxidizing and salt atmospheres at high temperatures (e.g., those found in aircraft engines), and the like. The sapphire probes tend to fracture quickly when cooled from 2500° F. to 70° F. by air nozzles in tests that approximate an engine environment. Sapphire probes under a 5000 psi bending stress can creep or deform at 2500° F. and are not well suited for meeting 5000-hour life requirements. Where the emissivity of the sapphire is supplemented by an emitter coating (such as iridium) or fitted with an insert of emitting material, the coating or emitted insert tends to erode within several hours of exposure to engine gas, with substantial temperature errors resulting. Accordingly, the need remains for a high temperature probe for an optical gas temperature sensor having a high flexural strength (defined as exceeding 50,000 psi at 2,500° F. on a four-point bending test), a low creep rate (defined as a creep rate of $5 \times 10^{-10} \text{sec}^{-1}$ with up to 5,000 psi stress at 2,500° F. which produces 1% strain over a 5,000 hour life), a high oxidation resistance (defined as less than 1% weight loss for a 5,000-hour life at 2,500° F. and as assessed during a 3,500-hour thermal cycling test using exhaust gases), and a high thermal shock resistance (defined as the capacity to withstand repeated cycling shocks from 2,500° F. to 1,000° F. within 3 seconds or 500° F./second, as could be applied with a high velocity torch and air gun). Additionally, the probe must exhibit a low thermal response time constant so that it responds rapidly to variations in the temperature of the gas stream. A one-second time constant under engine air flow conditions is generally acceptable and is the current practice with conventional thermocouple and engine control designs. Thin walls are required at the probe tip to insure adequately fast thermal response.

Accordingly, it is an object of the present invention to provide an improved high temperature optical probe for an optical gas temperature sensor for measuring the high-temperature, high-velocity of gases, and especially the high-temperature, high-velocity exhaust gas stream from an engine.

Another object is to provide such a probe which has a high flexural strength, a low creep rate, a high oxidation resistance, and a high thermal shock resistance.

A further object is to provide such a probe which has a low thermal response time constant.

It is also an object of the present invention to provide such a probe which is of simple and economical construction, easy to maintain, and easy to use.

SUMMARY OF THE INVENTION

It has now been found that the above and related objects of the present invention are obtained in a high temperature probe for an optical gas temperature sensor for a high-temperature, high-velocity gas stream (particularly one from an engine exhaust) comprising a support, a generally conical hollow tip, and a joint physically interconnecting the support and the tip. The tip includes as an electromagnetic radiation emitter a ceramic selected from the group consisting of silicon carbide and silicon nitride.

In a preferred embodiment the ceramic is sintered, dark colored and emits infrared radiation energy. It has a flexural strength in excess of 50,000 psi at 2,500° F., a high oxidation resistance, a high thermal shock resistance and a low thermal response time constant. The support is formed of high temperature alloy steel (such as Hastalloy X) and the joint is formed of a material having a coefficient of thermal expansion (CTE) that matches the ceramic CTE within 3 ppm/° F., such as molybdenum or Kovar. The joint is connected to the support by a threaded engagement and to the tip by a high temperature braze (e.g., an alloy of silver and copper).

The probe may additionally include a photodiode, a fiber optic light guide, and a lens disposed intermediate the light guide and the photodiode to focus light from the light guide onto the photodiode.

BRIEF DESCRIPTION OF THE DRAWING

The above brief description as well as objects and features of the present invention will be more fully understood by reference to the following detailed description of the presently preferred, albeit illustrative, embodiments of the present invention when taken in conjunction with accompanying drawing wherein:

FIG. 2 is a sectional view thereof, to an enlarged scale, taken along the line 2—2 of FIG. 1;

FIG. 3 is an exploded isometric view thereof; and

DETAILED OF THE PREFERRED EMBODIMENTS

Figure 1:
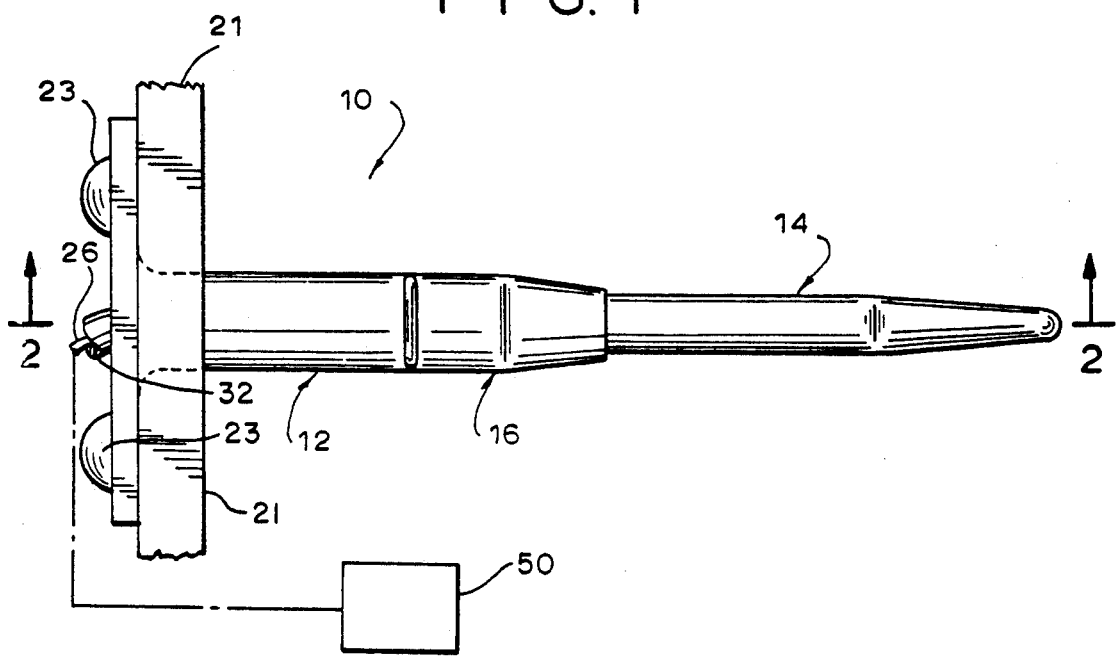
FIG. 1 is a side elevational view of a high temperature probe according to the present invention.
Figure 4:
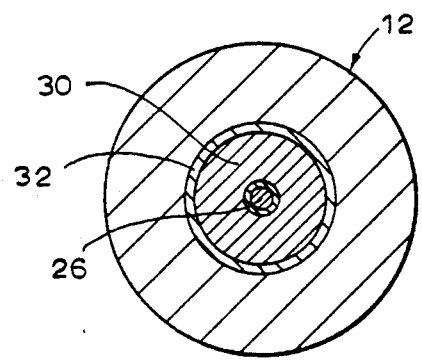
FIG. 4 is a sectional view thereof, to a slightly enlarged scale, taken along the line 4—4 of FIG. 2.

Referring now to the drawing, and in particular to FIG. 1 thereof, therein illustrated is a high temperature optical probe, generally designated by the reference numeral 10, according to the present invention for use in an optical gas temperature sensor for sensing the temperature of a high-temperature, high-velocity gas stream, such as an engine exhaust. The high temperature probe comprises in its basic aspects an axially hollow base or support generally designated 12, a generally conical hollow tip generally designated 14, and a joint, generally designated 16, physically interconnecting the support 12 and the tip 14.

The support 12 is used to position the tip 14 within the gas stream whose temperature is to be measured. As only the tip 14 must be positioned within the gas stream, the support may mount the probe in the gas stream in a cantilever fashion. Accordingly, the configurations and dimensions of the support may vary greatly without affecting operation of the probe. The support 12 is illustrated as "T"-shaped with the vertical element of the "T" being a hollow cylinder. Preferably the horizontal bar of the "T" includes apertures 20 for fastening the support 12 to a wall, piping, etc.—e.g., using screws 23 or bolts.

As is conventional in the art, the support 12 defines an axial hollow 22 and contains adjacent the front lens 24 configured and dimensioned to receive infrared light from the tip 14 and to focus that light onto a high temperature light waveguide 26 extending longitudinally into the axial hollow 22. The waveguide 26 extends rearwardly out the back of the axial hollow 22 of the support 12 and has its front end maintained within the axial hollow 22 by an annular fitting 30 such as a centrally apertured stainless steel disk. The waveguide 26 is preferably a gold-coated silica fiber, although glass fibers and other conventional optical waveguide materials may also be used advantageously. The waveguide 26 (and typically the fitting 30) are disposed inside a tubular protector 32, such as a stainless steel tube. The waveguide 26 and protector 32 are fastened to the support 12 by conventional means, for example, a low temperature braze 33 connecting the support 12 with the protector 32. The fitting 30 may be sealed on its outer surface to the protector 32 and on its inner surface to the waveguide 26 by a conventional weld (not shown). The rear end of the waveguide 26 transmits the light to a photodiode in a conventional infrared detector 50 (fragmentarily indicated in FIG. 1) which, with the aide of conventional amplifiers and a computer or microprocessor program, converts the electrical signal output of the photodiode into usable engineering units of temperature, such as degrees Fahrenheit or Celsius. The body of the support 12 is preferably formed of metal, and in particular a high temperature, high strength superalloy of nickel and iron available under the trade name Hastalloy X.

The generally conical hollow tip 14 is formed of, and uses as an electromagnetic radiation emitter, a sapphire-free ceramic which, at the high temperatures to be sensed, emits infrared radiation. The sapphire-free ceramic is selected from the group consisting of silicon carbide (SiC) and silicon nitride ($Si_3N_4$). The ceramics can be formed by various conventional manufacturing techniques; e.g., sintering. These dark colored ceramic materials exhibit a sufficiently high emissivity such that an additional emitter coating or insert is not required. Furthermore, the narrow angle conical cavity produces numerous reflections, and hence provides an effective emissivity nearly equal to unity. At 2,500° F., these materials have a high flexural strength exceeding 50,000 psi on a four-point bending test and a slow creep rate not exceeding $10^{-13} sec^{-1}$ with up to 5,000 psi stress (at 2,500° F. which produces a 1% strain over a 5,000-hour life), which is two orders of magnitude smaller than $10^{-11} sec^{-1}$, the maximum allowed. The high oxidation resistance of the materials, as assessed during a 3500 hour thermal cycling test using exhaust gases, is found to be less than a 1% weight loss for the 5,000-hour life and thus superior to metals. Cones made of these materials have withstood repeated cycling shocks from 500° F. to 1,000° F. within 3 seconds (500° F./sec), as could be created by high velocity torches and air guns. Hollow cone-shape tips formed with these materials exhibit a low (fast) thermal response time constant of approximately one second or less under engine air flow conditions, although similarly formed coated sapphire rods respond faster because the emitter layer is very thin compared to the wall thickness of the present invention.

The tip 14 has a wall thickness of about 0.030 inch, a length of about 2.50 inches, and an outer diameter of about 0.256 inch. Thus the length/diameter ratio is about 10 to 1. Higher ratios result in longer probes which enable the probe to extend further into the interiors of large engines. Thinner walls, especially at the forward end of the tip, improve the response time, but also compromise the life and durability of the probe. Accordingly, depending upon the relative importance placed on response time as opposed to longevity, thinner or thicker walls may be used relative to the recommended 0.030-inch wall illustrated.

The joint 16 connects the tip 14 to the support 12 so that the support 12 can position the tip 14 in the gas stream whose temperature is to be measured. The joint 16, which will typically be exposed to a temperature of about 700° F., must accommodate the mis-match in the thermal expansion between the ceramic of the tip 14 and the metal of the support 12. While the joint 16 is located out of the hot gas stream, it must still be able to withstand occasional temperatures as high as 1200° F. It has been found that the thermal expansion of molybdenum and Kovar (an iron/nickel/cobalt/manganese alloy) match the silicon carbide and silicon nitride materials very closely. The most severe stresses arise when the joint 16 is brazed at 1500° F. to the tip 14 and then cools within seconds. The joint material shrinks more than the tip material, thereby putting the joint material in tension and the tip material in compression. Stress analysis indicates that stresses on the order of 35,000 psi can result, such a stress being well within the capabilities of the aforementioned joint materials.

The joint 16 is secured at its front end to the tip 14 by a high temperature braze 34, such as a conventional silver/copper braze, and at its rear end to the support 12 by a threaded engagement 36. More particularly, the front end of the support 12 is externally threaded and the rear end of the joint 16 is internally threaded and adapted to receive therein in threaded engagement the externally threaded front end of the support 12. A metallic O-ring 38 formed, for example, of Hastalloy X is placed between the rear face of the joint 16 and the abutting front face of the support 12 so as to seal the hollow space 22.

While the present invention is described above in terms of a three-part construction including a silicon carbide or a silicon nitride tip 14, a metal support 12, and a interconnecting joint 16, alternative constructions may also be used. For example, a one-piece probe construction formed exclusively of silicon carbide or silicon nitride may be used, with a lens barrel including a standard optical fiber and focussing lens system being inserted into and brazed to the support 12. Alternatively, a two-piece probe construction may be used, with the tip 14 and support 12 being formed of the same silicon carbide or silicon nitride, and the two pieces 12, 14 being joined by a high temperature braze. In the two-piece construction, all parts exhibit identical thermal expansions and the brazed joints are all located well inside the cooler zone of the engine. A lens barrel leading to a fiber optic cable is inserted into the support hollow and sealed at the interface of the two pieces.

As is conventional in high temperature optical sensors, the sensor may employ a plurality of probes disposed in staggered relationship across the path of the high temperature gas stream in order to develop a portrait of the gas temperature profile in the stream. The various probes, with their independent tips, focusing lenses and fiber optic cables, can be joined into a probe assembly extending across the gas stream path in the nature of a rake, with the probe assembly providing indication of the gas temperature profile.

Commercially available ceramics contain numerous additives which improve strength, toughness, moldability, sintering, and other properties. These additives are tailored to meet the specific performance objectives of various applications. They typically improve one wanted characteristic, such as fracture toughness, but may reduce a property having lesser importance in the particular application, such as corrosion resistance. Commercially available alpha SiC or $Si_3N_4$ may contain up to 15% by weight of additives. Advancements in ceramic technology will improve the physical properties through bends of additives, higher purity and other means. The terms "silicon carbide" and "silicon nitride", as used herein and in the claims, encompass both ceramics wherein the majority of material is SiC or $Si_3N_4$ and ceramics commercially known as such.

To summarize, the present invention provides an improved high temperature probe for an optical gas temperature sensor, the probe exhibiting a high flexural strength, a low creep rate, a high oxidation resistance, and a high thermal shock resistance as well as a fast thermal time constant. The probe simple and economical construction, easy to maintain.

Now that the preferred embodiments of the present invention have been shown and described in detail, various modifications and improvements thereon will become readily apparent to those in the art. Accordingly, the spirit and scope of the present invention is to be broadly construed and limited only by the appended claims, and not by the foregoing disclosure.

We claim:

1. A high temperature optical probe for an optical gas temperature sensor for sensing the temperature of a high-temperature, high-velocity gas stream, comprising:
   (A) a support means for mounting said probe for interaction with the high-temperature, high-velocity gas stream;
   (B) a generally conical hollow tip for insertion into the gas stream formed of a ceramic selected from the group consisting of silicon carbide and silicon nitride to emit electromagnetic radiation at the high temperatures to be sensed;
   (C) a joint physically interconnecting said support means and said tip, said joint being formed and of a material to accommodate the thermal stresses caused by differences in thermal coefficients of expansion between said tip, said joint and said support means and the mechanical stresses caused by the interaction of said probe and the gas stream during high velocity movement of the gas stream past said tip, thereby to enable said probe to withstand said stresses; and
   (D) means supported in said probe to focus and transmit electromagnetic radiation emitted from said tip to effect a measurement of the temperature of the gas stream.

2. The probe of claim 1 wherein said ceramic is dark colored.

3. The probe of claim 1 wherein said ceramic has a flexural strength in excess of 50,000 psi at 2,500° F. on a four point bending test.

4. The probe of claim 3 wherein said ceramic has a high oxidation resistance of less than 1% weight loss for a 5,000 hour life at 2,500° F., a high thermal shock resistance of at least 500° F./sec, and a low thermal response time constant not exceeding 1 sec.

5. The probe of claim 1 wherein said ceramic emits infrared energy.

6. The probe of claim 1 wherein said support means is formed of metal.

7. The probe of claim 6 wherein said joint is formed of a material having a coefficient of thermal expansion that matches the coefficient of thermal expansion of said ceramic.

8. The probe of claim 7 wherein said joint is formed of a material selected from the group consisting of molybdenum and an alloy of iron/nickel/cobalt/manganese.

9. The probe of claim 6 wherein said metal is an alloy of nickel and iron.

10. The probe of claim 6 wherein said joint is connected to said support means by a threaded engagement and to said tip by a high temperature braze.

11. The probe of claim 10 wherein said high temperature braze is an alloy of silver and copper.

12. The probe of claim 1 wherein said tip is sapphire-free.

13. The probe of claim 1 wherein said ceramic is a sintered ceramic.

14. The probe of claim 1 wherein said support means in a cantilever fashion mounts said probe in the exhaust gas stream.

15. A high temperature optical probe for an optical gas temperature sensor for sensing the temperature of high-temperature, high-velocity gas stream, comprising:
   (A) a support means for positioning said probe in the high-temperature, high-velocity gas stream;

(B) a hollow, generally conical tip formed of a sapphire-free ceramic having a high flexural strength, a high oxidation resistance, a high thermal shock resistance, and a low thermal response time constant selected from the group consisting of silicon carbide and silicon nitride, which ceramic emits infrared energy related to the temperature of the exhaust gases proximate said tip;

(C) a joint physically interconnecting said support and said tip and formed and of a material capable of withstanding the mechanical stresses caused by the interaction of said probe and the gas stream during high velocity movement of the gas stream past said tip and having a thermal coefficient of expansion to accommodate the mismatch in thermal expansion between said tip, said joint and said support means, said material being selected from the group consisting of molybdenum and an alloy of iron/nickel/cobalt/manganese, said joint being connected to said tip by a high temperature braze;

(D) a lens positioned within said probe to focus said infrared energy emitted from said tip; and (E) an optical fiber positioned proximate said lens to transmit said focused infrared energy to a detector for providing a measurement of the temperature of the gases in the gas stream.

16. The probe of claim 15 wherein said support means in a cantilever fashion mounts said probe in the exhaust gas stream.

17. In combination, an engine and an optical gas temperature probe for an optical gas temperature sensor for measuring the temperature of the high-temperature, high-velocity engine exhaust gas stream, said optical gas temperature probe comprising:

(A) a probe including a support means mounting said probe in the high-temperature, high-velocity exhaust gas stream of said engine, a sapphire-free ceramic generally conical hollow tip for sensing the temperature of the exhaust gas stream, said tip being formed of a material which emits infrared radiation in response to exposure to the exhaust gas stream, and a joint physically interconnecting said support means and said tip, said joint being formed and of a material to accommodate the mechanical stresses caused by the interaction of said probe and the exhaust gas stream during high velocity movement of the exhaust gas stream past said tip and to compensate for the thermal stresses produced by the differences in the materials forming said support means, said joint and said tip;

(B) an infrared detector; and (C) means supported in said probe for transmitting the infrared radiation from said probe to said infrared detector which produces, in response thereto, an output indicative of the temperature of the exhaust gas stream.

18. The combination of claim 17 wherein said ceramic is selected from the group consisting of silicon carbide and silicon nitride; said ceramic being characterized by a dark color, a flexural strength in excess of 50,000 psi at 2,500° F. on a four point bending test, a high oxidation resistance of less than 1% weight loss for a 5,000 hour life at 2,500° F., a high thermal shock resistance of at least 500° F. sec, and a low thermal response time constant not exceeding 1 sec.

19. The combination of claim 17 wherein said support means in a cantilever fashion mounts said probe in the exhaust gas stream.

20. A method of sensing the temperature of high-temperature, high-velocity gases in an exhaust gas stream using an optical gas temperature sensor, comprising the steps of:

(A) providing a high temperature optical probe for the optical gas temperature sensor, the probe including:
  (i) a support means for mounting the probe for interaction with the high-temperature, high-velocity exhaust gas stream;
  (ii) a generally conical hollow tip for insertion into the exhaust gas stream, the tip being formed of a ceramic selected from the group consisting of silicon carbide and silicon nitride to emit electromagnetic radiation at the high temperatures to be sensed;
  (iii) a joint physically interconnecting the support means and the tip, the joint being formed and of a material to accommodate the thermal stresses caused by differences in thermal coefficients of expansion between the tip, the joint and the support means and the mechanical stresses caused by the interaction of the probe and the exhaust gas stream during high velocity movement of the exhaust gas stream past the tip, thereby to enable said probe to withstand both the thermal and mechanical stresses; and
  (iv) means supported n the probe to focus and transmit electromagnetic radiation emitted from the tip to the sensor to effect a measurement of the temperature of the exhaust gas stream;

(B) directing the exhaust gas stream past the tip of the probe to sense the temperature of the exhaust gases.

21. The method of claim 20 wherein the support means in a cantilever fashion mounts the probe in the exhaust gas stream.

22. A method for sensing the temperature of high-temperature, high velocity exhaust gases in an engine exhaust gas stream, using an optical gas temperature sensor, comprising the steps of:

(A) providing a high temperature optical probe for the optical gas temperature sensor, the probe including:
  (i) a support means for positioning the probe in the high-temperature, high-velocity engine exhaust gas stream;
  (ii) a hollow, generally conical tip formed of a sapphire-free ceramic having a high flexural strength, a high oxidation resistance, a high thermal shock resistance, and a low thermal response time constant selected from the group consisting of silicon carbide and silicon nitride, which ceramic emits infrared energy related to the temperature of the exhaust gases proximate said tip;
  (iii) a joint physically interconnecting the support means and the tip and formed and of a material capable of withstanding the mechanical stresses caused by the interaction of the probe and the exhaust gas stream during high velocity movement of the exhaust gas stream past the tip and having a thermal coefficient of expansion to accommodate the mismatch in thermal expansion between the tip, the joint and the support means, the material being selected from the group consisting of molybednum and an alloy of iron/nickel/cobalt/manganese, the joint being connected to the tip by a high temperature braze;

(iv) a lens positioned proximate the joint to focus the infrared energy emitted from the tip; and
(v) an optical fiber positioned proximate the lens to transmit the focused infrared energy to a detector for providing a measurement of the temperature of the gases in the exhaust gas stream; and (B) directing the exhaust gas stream past the tip of the probe to sense the temperature of the exhaust gases.

23. The method of claim 22 wherein the support means in a cantilever fashion mounts the probe in the exhaust gas stream.

* * * * *